3,249,402
RECOVERY OF SULFUR FROM BLAST
FURNACE SLAG
William H. Smyers, Westfield, and Erwin H. Manny, Cranford, N.J., assignors to Esso Research and Engineering Company, a corporation of Delaware
Filed Oct. 2, 1962, Ser. No. 227,803
2 Claims. (Cl. 23—224)

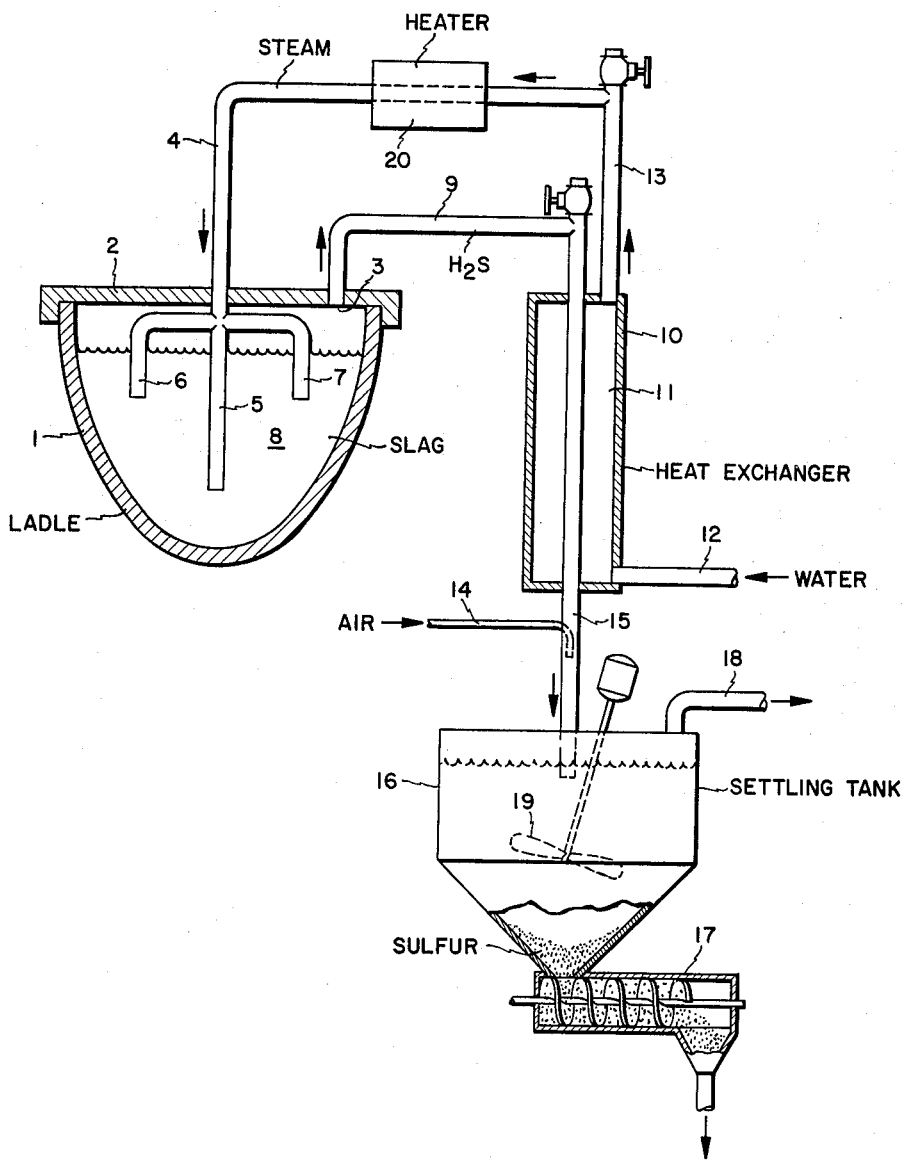

This invention relates to a steam treatment of molten slag from a blast furnace used in making pig iron, and more particularly of slag having a relatively high sulfur content, both to recover sulfur from the slag and to improve the slag by reducing or eliminating its sulfur content.

In the manufacture of iron from iron ore with coke and limestone, the slag formed amounts to ⅓ to ½ ton per ton of iron produced. Sulfur present in the materials charged to the blast furnace comes out partially in the iron (e.g. 0.03% S), but mostly in the slag (e.g. 1.0% S). The slag contains the sulfur in the form of calcium sulfide dissolved in calcium aluminosilicate.

The molten slag which collects above the molten iron, as in the upper part of the hearth of a blast furnace, has been generally tapped through a hole to be run into a brick-lined ladle or down a gutter into a container for transportation to an open dump heap or into water where it is rapidly cooled and becomes granulated. There are a number of uses for the slag, depending on its composition and grinding requirements. Ground basic slag can be adjusted for use in making Portland cement; high sulfur is undesirable for such use in cement. High sulfur is also objectionable in slag to be used as aggregate in concrete or as soil conditioner for agricultural or horticultural work.

Slag formed in a blast furnace using a low sulfur content coke (e.g. 1.0% S) usually contains only about 0.5 to 1.0% S; however, in using a crude petroleum fuel oil which contains 3.0 to 4.0% S in partial replacement of coke in a blast furnace to improve the efficiency of the furnace, the resulting slag has been found to contain usually 50 to 100% more sulfur, i.e. about 1.5 to 2.0%. The coke and oil may be considered as carbonaceous fuels and reducing agents.

In accordance with the present invention, an improvement is made by treatment of molten slag, particularly of high sulfur content, by superheated steam contacted to mix the slag and react with calcium sulfide in the slag so as to decompose the calcium sulfide therein with evolution of hydrogen sulfide and formation of calcium oxide which remains dissolved in the slag as calcium aluminosilicate. In this procedure, the slag is cooled slightly but not enough to solidify it. The $H_2S$ evolved can be used as a heating medium, or treated with oxygen to recover elemental sulfur $$(H_2S + O \rightarrow H_2O + \downarrow)$$

or used in any other desired chemical reaction.

The treatment of the molten slag with steam can be carried out in the ladle or container which receives the molten slag from the blast furnace, as described with reference to the schematic drawing. Usually, about 100 to 400 cu. ft. of steam per ton of slag are required to obtain the desired yield of hydrogen sulfide.

Referring to the drawing, the molten slag is shown to be held in a ladle 1, which is fitted with a cover 2 (either inside or outside the top of the ladle) having a gas outlet 3 and an inlet 4 for steam. The inlet 4 may be a steel alloy for piping the steam into refractory tubes 5, 6 and 7 which sparge the steam into the molten slag 8 when the molten slag is cooling slowly at temperatures in the range of 2400° to 2700° F.

The steam at the inlets to the slag is preferably at temperatures in the range of about 500° to 2500° F.

From the outlet 3, the gaseous mixture of steam and $H_2S$ is led by pipe 9 to a heat exchanger 10 in which heat is transferred to cooling water and steam passed through the jacket space 11 from inlet 12 to outlet 13, which leads to the inlet 4.

Air to oxygen in a measured amount is passed from line 14 into the stream containing $H_2S$ and $H_2O$ which leaves the heat exchanger 10 in the conduit 15. The oxygen reacts with the $H_2S$ to form $H_2O$ and sulfur at a rapid rate in a short period at a temperature in the range of 2000° to 2700° F. The gaseous reaction mixture containing the sulfur is discharged into the settling tank 16 in which the sulfur drops to the bottom. The sulfur is withdrawn from the bottom of tank 16 by any suitable conveying means, such as a rotating helical conveyor 17. The gaseous mixture containing water vapor is withdrawn from tank 16 through outlet 18. If excess oxygen or air is used, the $H_2S$ can be converted to $SO_2$ according to the equation:

$$2H_2S + 3O_2 \rightarrow 2H_2O + 2SO_2$$

A motor driven agitator 19 may be used in the tank 16. The steam generated in the heat exchanger 10 is preferably superheated when it is passed through a heater 20 on its way to be sparged into the molten slag.

Alternatively, the steam may be injected into the molten slag as the latter runs down the trough from the slag hole in the blast furnace, provided a firebrick-lined cover is placed over the trough for collecting the hydrogen sulfide formed.

The following example illustrates suitable conditions for mixing steam with molten slag.

*Example*

A representative molten slag produced in a blast furnace in which a Bunker C fuel oil is used to replace part of the coke has the following average analysis:

| | Percent |
|---|---|
| $SiO_2$ | 30.0 |
| $Al_2O_3$ | 20.0 |
| CaO | 35.0 |
| MgO | 12.0 |
| MnO | 0.5 |
| S | 1.7 |
| FeO | 1.0 |

The molten slag, as drawn from the blast furnace into the ladle, has a temperature of about 3000° F. After the ladle is filled to suitable capacity so as to contain about 4 tons (8,000 lbs.) of molten slag, it is fitted with a cover which inserts the steam injecting tubes and is fitted with an outlet pipe for steam carrying out $H_2S$. Steam at a temperature of 800° F. and under a pressure of 10 to 100 p.s.i.g. is introduced into the molten slag held in the ladle at a rate of about 10 to 50 cu. ft./min. for about ½ hr. until approximately 80% of the sulfur content of the ladle is reacted. During the introduction of steam into molten slag, the molten slag is cooled at a relatively slow rate until it reaches a temperature of approximately 2500° to 2700° F., at which point the cover withholding the refractory steam injectors is removed and the ladle is then emptied of its slag content to be further cooled, either in the air or by dumping into water. The recovered solidified slag is given a sulfur content below about 0.4% and has an improved suitability for use in Portland cement, and as aggregate in concrete.

In general, a slag containing 1.0 to 2.0% S has its content lowered to the range of about 0.1 to 0.5% S by the treatment described.

It is to be understood that modifications may be made in the steps of handling the materials formed in treating the molten slag with the high temperature steam.

The invention described is claimed as follows:

1. A process for recovering sulfur from molten blast furnace slag formed by the reduction of iron ore to iron using a carbonaceous fuel and a limestone flux, wherein said slag has a sulfur content of about 1 to 2%, and wherein said sulfur is in the form of calcium sulfide dissolved in calcium aluminosilicate, which comprises contacting said molten slag while it is cooling from about 3000° F. to a temperature in the range of about 2400° to 2700° F., with about 100 to 400 cubic feet per ton of slag of superheated steam at a temperature of about 500° to 2500° F. to evolve $H_2S$, drawing off a hot gaseous stream of $H_2S$ and $H_2O$, injecting an oxygen-containing stream into said gaseous stream of $H_2S$ and $H_2O$ to thereby react oxygen with the $H_2S$ at a temperature of about 2000° to 2700° F. to form $H_2O$ and sulfur, and then recovering said sulfur.

2. A process according to claim 1, wherein said oxygen-containing stream is an air stream and said sulfur is recovered by collecting said $H_2O$ and sulfur in a settling tank, and then drawing off sulfur from the bottom of said tank.

References Cited by the Examiner

UNITED STATES PATENTS

| | | | |
|---|---|---|---|
| 737,579 | 9/1903 | Burschell | 23—225 |
| 1,235,953 | 8/1917 | Bacon | 23—181 |
| 1,244,688 | 10/1917 | Becket | 75—30 X |
| 1,535,109 | 4/1925 | Davies | 75—30 X |
| 2,727,815 | 12/1955 | Kjellman. | |
| 2,740,691 | 4/1956 | Burwell | 23—181 |
| 3,033,671 | 5/1962 | Uemura | 75—30 X |

FOREIGN PATENTS 801,883  9/1958  Great Britain.

OTHER REFERENCES

Ser. No. 362,376, Koppers (A.P.C.), published April 27, 1943.

BENJAMIN HENKIN, *Primary Examiner*.

MAURICE A. BRINDISI, *Examiner*.